FIG. I

INVENTOR
John Alan Scarlett
BY
Baldwin & Wight
ATTORNEYS

United States Patent Office 3,372,324
Patented Mar. 5, 1968

3,372,324
D.C. POWER SUPPLY ARRANGEMENTS
John Alan Scarlett, Maldon, England, assignor to The Marconi Company Limited, London, England, a British company
Filed Oct. 18, 1965, Ser. No. 497,241
Claims priority, application Great Britain, Aug. 3, 1965, 43,206/64
9 Claims. (Cl. 320—39)

ABSTRACT OF THE DISCLOSURE

A D.C. power supply arrangement employing a floating battery, the power supply arrangement is adapted for connection to an A.C. source, a rectifier circuit is employed for supplying charging current to the battery through a resistor in series with the battery. The charging current supplied to the battery is monitored and the time duration per A.C. cycle during which charging current is supplied to the battery is varied in accordance with an increase or a decrease in charging current level above or below a predetermined desired level thereof.

Figure 1:
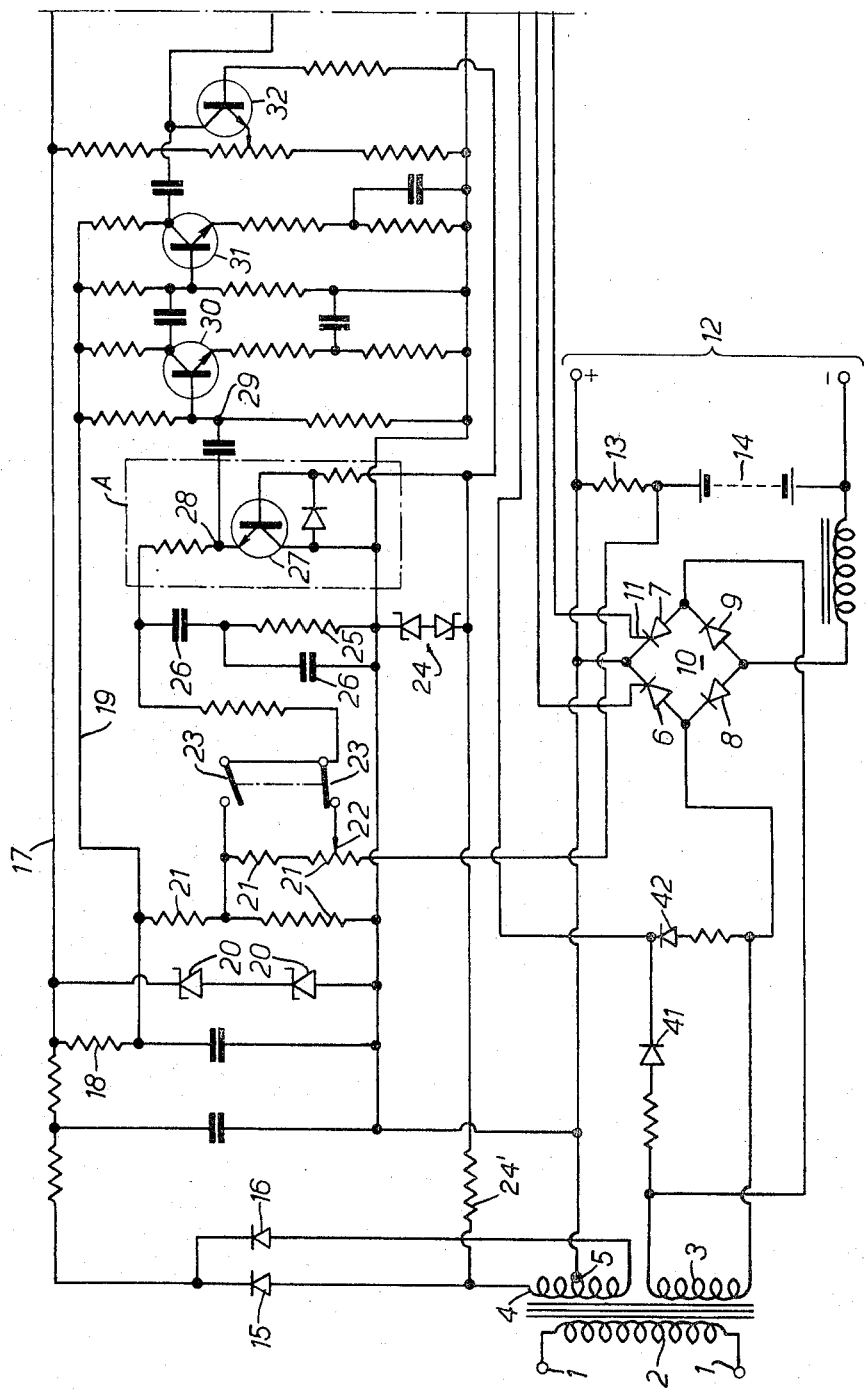

The current through the series resistor is employed in the provision of a reference voltage and the rectifier circuit may employ SCR's which, when triggered into conduction, supply the charging current to the battery. Variations in the reference voltage are employed to determine the duration of the period of conduction of the SCR's per each A.C. cycle.

This invention relates to D.C. power supply arrangements including a floating battery, by which term is meant a battery which, in use, is permanently connected to load terminals so as to act as a stand-by source of power for the load if a mains or other power supply also connected to the load should fail. Though not limited to its application thereto the invention is particularly well suited for and is primarily intended for use in D.C. power supply arrangements for supply operating D.C. power to so-called logic circuits such as are employed in computers and the like. The invention seeks to provide improved and reliable D.C. power supply arrangements of high efficiency which will automatically keep a floating battery therein substantially fully charged under conditions of almost constant charging current, irrespective of load variations, ready to act as an emergency stand-by source of power for a substantial period of time which will, of course, be determined by the capacity of the battery.

According to this invention a D.C. power supply arrangement including a floating battery; a rectifier circuit connected to rectify A.C. voltage from a supply thereof; a resistance of low value in relation to the internal resistance of the battery in series in a charging current circuit for said battery; and control circuit means actuated by departures of the charging current from a pre-determined value for controlling the period per cycle of A.C. in which current rectified by said rectifier circuit is supplied as charging current to said battery so as to increase said period in response to a decrease of charging current below said value and decrease said period in response to an increase of charging current above said value.

Preferably also the rectifier circuit includes voltage switchable rectifying means and control of the aforesaid period is effected by controlling the period per cycle of A.C. in which said rectifying means is or are switched on. Preferably one or more silicon controlled rectifiers are employed as voltage switchable rectifying means and a preferred rectifier circuit comprises four rectifiers, of which two are voltage switchable, connected in a bridge with A.C. applied across one bridge diagonal and rectified current taken from between the ends of the other.

A preferred control circuit for controlling the period per cycle of A.C. in which current rectified by the rectifier circuit is supplied as charging current comprises further means for rectifying A.C. voltage from the A.C. source; means for superimposing a D.C. voltage derived from said further means upon voltage set up across the low value resistance in the charging current circuit to produce a resultant D.C. voltage; means for transforming voltage waves from the A.C. source into at least approximately square waves; a chopper operated by A.C. voltage from said A.C. source for chopping said resultant D.C. voltage and comparing it with a pre-determined reference voltage to produce either a square wave resultant or a chopped D.C. voltage resultant in dependence upon whether said resultant D.C. voltage differs from or is equal to said reference voltage; an electronic switch synchronised with said chopper and connected to clamp a signal derived from the output from said chopper to a further pre-determined voltage to produce either a square wave control output or zero control output depending upon the relation between the aforesaid resultant D.C. voltage and the first mentioned pre-determined voltage, said control output, when present, having a polarity representative of the sense of the difference between the aforesaid resultant D.C. voltage and the first mentioned pre-determined voltage; an integrator for integrating the control output to produce a D.C. voltage which rises in response to the presence of an approximately square wave control output of one polarity and falls in response to the presence of an approximately square wave control output of the opposite polarity; a ramp voltage generator controlled by amplitude limited waves of the same polarity and derived from the A.C. source to produce a succession of rising voltage ramps in response to said amplitude limited waves; means for comparing the produced voltage ramps with the D.C. voltage from the integrator; and means, actuated when the ramp voltage exceeds the D.C. voltage from the integrator for rendering the rectifier circuit effective to supply charging current to the battery.

Preferably the superimposed D.C. voltage is adjustable. Preferably also switch operated means, intended for use to secure rapid charging of the battery should it be run down, are provided for temporarily increasing the superimposed D.C. voltage to a value which is high in respect to that superimposed in normal circumstances.

If desired indication and/or alarm means, automatically actuated in response to the occurrence of a D.C. integrator output voltage outside pre-determined limits of voltage, may be provided.

In normal preferred practice the battery is a sealed battery of nickel-cadmium cells.

Figure 2:
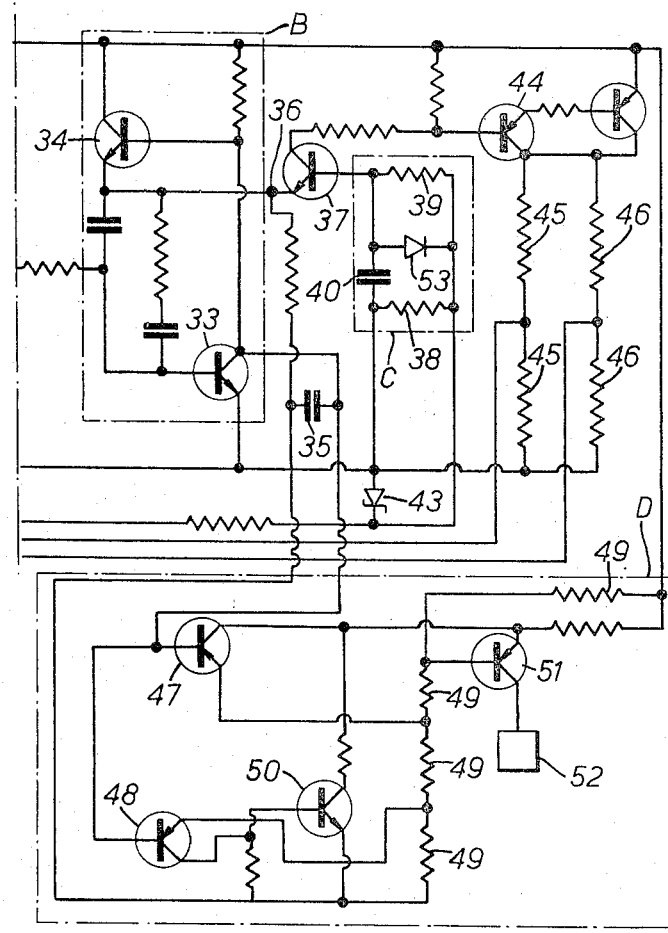

The invention is illustrated in the accompanying drawings in which FIGURES 1 and 2 illustrate a circuit diagram of one embodiment.

Referring to FIGURE 1 of the drawings power is supplied from A.C. mains terminals 1 to the primary 2 of a transformer having two secondaries 3 and 4, the latter being centre-tapped at 5. Voltage from secondary 3 is applied between the ends of one diagonal of a rectifier bridge consisting of four rectifiers 6, 7, 8 and 9 of which 6 and 7 are silicon controlled rectifiers (SCR's) having control electrodes 10 and 11. The ends of the other diagonal of the bridge are connected to the D.C. output terminals 12 between which a load (not shown) is connected and between which a resistance 13 in series with a battery 14, preferably of nickel-cadmium cells, is connected. The resistance 13 is of value which is low in relation to the internal resistance of the battery. To quote a practical figure its resistance value might be 3 milliohms and it could be constituted merely by a suitable piece of wire. The purpose of this resistance is to provide a voltage (for control purposes to be described later) representative of the charging current to the so-called floating battery and it is of low value in order (as will be apparent later) that it may have only very small or negligible effect on voltage regulation.

Control, exercised in dependence upon the current through resistance 13, is automatically effected to ensure that the charging current to the battery is, to a close degree of approximation, constant at a pre-determined value, this control being obtained by controlling the periods per cycle of A.C. during which the SCR's 6 and 7 are permitted to conduct by control voltages applied to their electrodes 10 and 11. If the charging current falls below the correct pre-determined value, the period per A.C. cycle during which charging current flows is automatically increased beyond a certain value: if the charging current increases above the correct pre-determined value the said period is automatically decreased below said certain value. The arrangements for effecting this control will now be described.

Voltage from secondary 4, the centre tap 5 on which is connected to the positive output terminal, is rectified by a full wave rectifier comprising diodes 15 and 16 and supplied to line 17 on which a positive D.C. voltage of, say 15 volts is produced and to which is connected, by a resistance 18, a line 19 carrying a somewhat lower positive voltage of, say, 12 volts. These voltages are stabilised by means of a pair of series connected Zener diodes 20 between line 17 and the centre tap 5.

Voltage produced by the charging current through resistance 13—this voltage might in practice be −1 millivolt—is shifted, at slider 22 on resistor 21, into the positive region by superimposition thereon of a positive voltage from line 19. This is done by means of a resistance network consisting of resistance 21 which interconnects line 19 with the reference point 5. The shifted voltage, which appears on slider 22 on one of the resistances 21, can be adjusted as to the amount of shift by moving said slider. The purpose of the ganged switches 23 will be described later: their normal position is that shown in which they may be presumed to be. To quote a practical figure the voltage of −1 mv. from resistance 13 might be shifted to a voltage of +4 mv., as measured at the slider 22.

The substantially sinusoidal voltage wave at one end of the secondary 4 is squared by the action of a pair of Zener diodes 24 connected back to back between the centre tap 5 and (through resistance 24′) to said end. The resultant square wave is applied to operate a so-called "chopper" which is within the chain line block A to "chop" voltage fed thereto from slider 22. A smoothing circuit to eliminate A.C. ripple is connected between the input end of the chopper A and the centre tap 5 and consists of resistance 25 and condensers 26. The chopper includes a transistor 27 which on positive halves of the applied square wave, is rendered conductive and clamps the point 28 with respect to reference point 5 at a potential such that, under correct operating conditions, i.e., when the required pre-determined value of charging current flows through resistance 13, the potential at 28 is the same as that of the slider 22. The slider is adjusted to achieve this result. In this condition no output appears at point 29. If, however, the battery charging current falls below the pre-determined value at which the potentials at 28 and 22 are the same, a succession of positive half square waves appears at point 29 while if the charging current rises above the said pre-determined value a succession of negative half square waves appear at said point 29.

The voltage wave (if any) at point 29 is amplified by two cascaded high gain amplifiers comprising transistors 30 and 31 respectively and clamped by a clamping transistor 32 operated in phase with the chopper by the same voltage which is applied to the base of the transistor 27. This clamping transistor 32 clamps a reference voltage above or below which (as the case may be) stand the positive or negative amplified square waves from the preceding amplifying transistor 21.

The clamped output from transistor 32 is fed to an integrator within the chain line block B shown in FIGURE 2. The integrator shown is a known so-called Miller integrator comprising a transistor 33 preceded by an emitter follower transistor 34. 35 is a decoupling condenser.

A D.C. potential appears at the output point 36 of the integrator and it will be seen that this will be of a certain value so long as the control system is steady in the condition in which no potential difference exists between points 22 and 28, i.e, so long as the charging current through the battery is steady at the pre-determined value. If, however, the charging current departs from this value the D.C. potential at point 36 will rise or fall (depending on the direction of departure) so long as that departure exists. When, however, the charging current is restored to the pre-determined value and the potential difference between points 22 and 28 disappears, the potential at point 36 drifts slowly back to the aforesaid certain value.

Transistor 37 in effect compares voltage at the point 36 with a so-called ramp voltage produced by a ramp voltage circuit within the chain line block C. This circuit, which comprises a diode 53, resistance 38 and 39 and condenser 40 is as known per se and produces an exponentially rising voltage each time a trapezoidally shaped positive half wave is applied to it. These trapezoidal half-waves are derived from the secondary 3 by means of a full wave rectifier circuit including diodes 41 and 42 and a Zener diode 43 which amplitude limits the positive half waves resulting from rectification and thereby transforms them into substantially trapezoidal half waves which charge the condenser 40 during their rising slopes. The exponential ramp voltage is applied to the base of the transistor 37 which is normally cut off but conducts when the ramp voltage exceeds the D.C. voltage which is at point 36 and is applied to the emitter of transistor 37. When this happens transistor 37 conducts and in turn renders the following transistors 44, previously cut-off, conductive. Collector current accordingly flows through resistances 45 and 46 producing, at intermediate points thereon, voltages which are applied to the control electrodes 10 and 11 of the SCR's 6 and 7 and switch them on. As will be apparent the higher the D.C. voltage at point 36 the longer will be the interval, in each half cycle of the mains input, before the ramp voltage at the base of transistor 37 exceeds it and the later will the SCR's 6 and 7 be switched on. In this way the charging time of the battery, per cycle, is automatically controlled by the charging current, any reduction in this current below the pre-determined intended value resulting in an increase in charging time and any increase in this current above this value causing a decrease in charging time. The change in charging current, will, of course, be quite small and is, in fact, a self-cancelling "error change." From the point of view of battery charging and ignoring this small "error change," the battery can be regarded as charged by a constant current. The battery is thus kept fully charged.

It is, of course, possible—due for example to failure of the mains supply over a substantial period—for the battery to be run down by the load. If this happens it is desirable to re-charge it, when the supply is resumed, with a temporarily higher value of charging current. This may conveniently be done by moving the ganged switches 23 to their other positions, thus replacing the voltage normally supplied by the slider 22 by a substantially more positive voltage. When the battery is charged the switches are put back to their normal positions and normal operation resumed.

Within chain line block D is apparatus which is preferably provided and serves for monitoring the operation of the apparatus. This comprises two transistors 47 and 48 which are normally cut off and to the bases of which are applied the voltage at the collector of transistor 33. Pre-determined different positive voltages are applied from a potentiometer comprising resistances 49 to the emitters of transistors 47 and 48, that on the emitter of transistor 47 being higher than that on the emitter of transistor 48. The emitter voltages are so chosen that if the potential 36 rises above a pre-determined upper limit transistor 47 conducts while if it falls below a pre-determined lower limit transistor 48 conducts. Transistor 50 inverts the output of transistor 48 and the collectors of transistors 50 and 47 are connected to the emitter of a normally conductive further transistor 51. If either transistor 47 or 48 conducts, transistor 51 is cut off and this cutting off actuates in any convenient known manner (not illustrated) an alarm or fault indicator represented by the block 52.

It will be seen that the arrangement described is of exceptionally high efficiency for the losses are very low. In an experimental installation as illustrated, designed for a 40 volt battery and a maximum load of 6 amps, an overall efficiency (from mains input to D.C. output) of over 80% was achieved using a transformer (2-3-4) with an efficiency of 95%.

I claim:

1. A D.C. power supply arrangement including a floating battery; a rectifier circuit connected to rectify A.C. voltage from a supply thereof; a resistance of low value in relation to the internal resistance of the battery in series in a charging current circuit for said battery; and control circuit means actuated by departures of the charging current from a pre-determined value for controlling the period per cycle of A.C. in which current rectified by said rectifier circuit is supplied as charging current to said battery for increasing said period in response to a decrease of charging current below said value and for decreasing said period in response to an increase of charging current above said value.

2. A power supply arrangement according to claim 1 wherein the rectifier circuit includes voltage switchable rectifying means and control of the aforesaid period is effected by controlling the period per cycle of A.C. in which said rectifying means is switched on.

3. A power supply arrangement according to claim 2 wherein at least one silicon controlled rectifier is employed as said voltage switchable rectifying means.

4. A power supply arrangement according to claim 2 wherein the rectifier circuit comprises four rectifiers, of which two are voltage switchable, connected in a bridge with A.C. applied across one bridge diagonal and rectified current taken from between the ends of the other.

5. A power supply arrangement according to claim 1 wherein the control circuit means for controlling the period per cycle of A.C. in which current rectified by the rectifier circuit is supplied as charging current comprises further means for rectifying A.C. voltage from the A.C. source; means for superimposing a D.C. voltage derived from said further means upon voltage set up across the low value resistance in the charging current circuit to produce a resultant D.C. voltage; means for transforming voltage waves from the A.C. source into at least approximately square waves; chopper means operated by A.C. voltage from said A.C. source for chopping said resultant D.C. voltage and comparing it with a pre-determined reference voltage to produce selectively a square wave resultant and a chopped D.C. voltage resultant in response to said resultant D.C. voltage differing from said reference voltage and in response to said D.C. voltage being equal to said reference voltage respectively; an electronic switch synchronised with said chopper and connected to clamp a signal derived from the output from said chopper to a further predetermined voltage to produce selectively a square wave control output and a zero control output depending upon the relation between the aforesaid resultant D.C. voltage and the first mentioned predetermined voltage, said control output, when present, having a polarity representative of the sense of the difference between the aforesaid resultant D.C. voltage and the first mentioned pre-determined voltage; an integrator for integrating the control output to produce a D.C. voltage which rises in response to the presence of an approximately square wave control output of one polarity and falls in response to the presence of an approximately square wave control output of the opposite polarity; a ramp voltage generator controlled by amplitude limited waves of the same polarity and derived from the A.C. source to produce a succession of rising voltage ramps in response to said amplitude limited waves; means for comparing the produced voltage ramps with the D.C. voltage from the integrator; and means, actuated when the ramp voltage exceeds the D.C. voltage from the integrator for rendering the rectifier circuit effective to supply charging current to the battery.

6. A power supply arrangement according to claim 5 wherein the superimposed D.C. voltage is adjustable.

7. A power supply arrangement according to claim 5 wherein switch operated means for providing rapid charging of the battery should it be run down, are provided for temporarily increasing the superimposed, D.C. voltage to a value which is high in respect to that superimposed in normal circumstances.

8. A power supply arrangement according to claim 5 wherein the battery is a sealed battery of nickel-cadmium cells.

9. A D.C. power supply arrangement including a floating battery, input means for connection to an A.C. source, rectifying means connected to said input means for rectifying an A.C. voltage, a resistor in series with said battery, said resistor having a resistance which is relatively low with respect to the internal resistance of said battery, said rectifying means being connected to said battery through said resistor for charging of said battery and control circuit means responsive to both increases in charging current supplied to said battery above a predetermined value and decreases in charging current below said predetermined value for controlling the time duration of charging current per cycle of A.C. voltage applied to said input means, said control circuit means comprising means for detecting both increases and decreases in said charging current and duration altering means responsive to said means for detecting for increasing said duration upon detection of a decrease in charging current and for decreasing said duration upon detection of an increase in charging current.

References Cited

UNITED STATES PATENTS

| | | | |
|---|---|---|---|
| 2,991,410 | 7/1961 | Seike | 323—100 |
| 3,201,681 | 8/1965 | Van Wilgen et al. | 323—20 |
| 3,300,704 | 1/1967 | McMillen | 320—61 |
| 3,305,725 | 2/1967 | Huge et al. | 307—46 |
| 3,310,729 | 3/1967 | Burgess et al. | 321—18 |

JOHN F. COUCH, *Primary Examiner.*

S. M. WEINBERG, *Assistant Examiner.*